United States Patent [19]
Weikel

[11] Patent Number: 6,039,647
[45] Date of Patent: Mar. 21, 2000

[54] GRAIN SWEEPER DEVICE

[75] Inventor: Charles W. Weikel, Geneva, Ill.

[73] Assignee: Agricultural Building Holdings, Inc., Mendota, Ill.

[21] Appl. No.: 08/871,219

[22] Filed: Jun. 9, 1997

[51] Int. Cl.[7] .................................................. A01D 17/02
[52] U.S. Cl. ........................ 460/114; 460/119; 414/310
[58] Field of Search .................................. 460/119, 114, 460/115, 116; 414/310, 311, 312, 313, 314, 315, 316, 317, 318, 319

[56] References Cited

U.S. PATENT DOCUMENTS

| | | | |
|---|---|---|---|
| 4,029,219 | 6/1977 | Rutten et al. | 414/310 X |
| 4,313,705 | 2/1982 | Jackson | 414/312 |
| 5,167,318 | 12/1992 | Siemens | 414/310 X |

FOREIGN PATENT DOCUMENTS

| | | | |
|---|---|---|---|
| 404187024 | 7/1992 | Japan | 460/119 |
| 405130808 | 5/1993 | Japan | 460/119 |
| 406339326 | 12/1994 | Japan | 460/114 |

*Primary Examiner*—H. Shackelford
*Attorney, Agent, or Firm*—Rockey, Milnamow & Katz, Ltd.

[57] ABSTRACT

A grain sweeper mechanism having an auger supported in cantilevered fashion in front of a drive mechanism having a pair of wheels. A weight stack carried by the drive mechanism counterbalances the weight of the auger such that generally all weight is borne by the front drive wheel of the drive mechanism. The front drive wheel is operatively coupled with the outer end portion of the auger for receiving rotational power therefrom. An opening in a shroud of the auger extends generally the entire length of the auger. The drive mechanism is coupled with the auger shroud by way of an attaching mechanism which includes a slide member, channel member, threaded member and nut which allows vertical adjustment of the auger while hindering lateral movement of the drive mechanism with respect to the auger.

17 Claims, 2 Drawing Sheets

GRAIN SWEEPER DEVICE

BACKGROUND OF THE INVENTION

FIELD OF THE INVENTION

This invention relates to grain sweeper mechanisms which direct grain toward the center of a grain tank for collection.

It is known to provide mechanisms for sweeping or otherwise clearing grain from the floor of a grain tank. Conventional grain sweepers typically include an auger that rotates about its central axis for directing grain that is lying on the floor of the grain tank toward a central opening in the floor of the grain tank. The grain then falls through the central opening in the floor for conveying to the outside of the tank. The auger extends from the center to the circumference and is coupled with a central structure that is located near or above the central opening. The auger is pivotally coupled with this central structure for swinging about the central opening. The auger acts to direct grain toward the central opening as it gradually travels on a radius within the grain tank, and thereby travels over generally the entire floor surface of the grain tank. A power source such as an electric motor is mounted to the central structure for supplying rotational power to the auger. A drive structure is typically coupled with the auger for propelling the auger about the central opening, and typically includes floor engaging wheels or a track drive that will establish traction on the floor of the grain tank. The power source that drives the auger also supplies power to the floor engaging drive wheels or tracks which drive the auger within the grain tank.

Conventional grain sweepers typically transmit power hydraulically from the power source to the drive structure. Such mechanisms include a hydraulic pump driven by the power source, a plurality of hydraulic lines which extend along the frame of the auger from the hydraulic pump to the location of the drive structure, and a hydraulic motor mounted on the drive structure for driving the drive wheel. The long hydraulic lines tend to require a large amount of hydraulic fluid, which requires the hydraulic reservoir or tank to be relatively large. Also, the relatively long distances that the hydraulic lines extend tend to cause the fluid to incur relatively large hydraulic pressure losses as the fluid travels within the hydraulic lines. The hydraulic pumps and motors must therefore be sized large enough to compensate for the energy losses incurred in the long hydraulic lines that extend out to the drive wheels.

The drive structures of prior art grain sweepers are generally positioned behind the auger. The drive structures tend to include a floor engaging drive wheel or track positioned behind the auger. Conventional grain sweepers tend also to include structure positioned in front of the auger for engaging the floor or the grain directly in front of the auger. Some grain sweepers provide floor engaging wheels positioned in front of the auger which help stabilize the auger and hold the auger in its proper operating position and orientation as it travels through grain at the bottom of the grain tank. These wheels can obstruct grain from engaging the auger properly and can thereby interfere with the auger's proper function of directing grain toward the central opening. Some grain sweepers include agitators that are positioned in front of the auger for agitating or breaking up the compacted grain in front of the auger. These agitators tend to add to the overall cost of the grain sweeper, and can sometimes obstruct grain from properly engaging the auger.

The drive structures are typically mounted with the auger in such a way that the position of the auger with respect to the drive structure is vertically adjustable for manipulating the height at which the auger engages the grain. These mounting mechanisms tend to include a large number of parts, which tend to increase the cost of the grain sweeper, and also tend to add complexity to the adjustment process.

Some conventional grain sweepers provide an auger that is generally enclosed within a shroud or cover during operation. A plurality of openings are formed in the forward portions of the shroud which allow the auger to engage the grain as the auger travels within the grain tank. The shroud generally encloses the auger so that it is less likely that objects or a persons hands or feet will contact the auger during operation. The portions of the shroud between the openings tend to block grain from entering the shroud and engaging the auger for being directed to the central opening. Agitators in front of the auger thereby serve to direct this grain toward the openings in the shroud such that all the grain lying on the floor of the tank will be received by the auger. Other types of prior art grain sweepers do not enclose the auger within any type of shroud, but rather include a bar that extends behind the auger. The drive structure is mounted to the bar and imparts a force through the bar for propelling the auger across the floor of the grain tank.

It would be desirable to provide a grain sweeper having a drive structure that is coupled with the auger by way of a mounting structure that is simple in construction, that is easy for the operator to adjust, and that includes relatively few parts so that it is simple and inexpensive to manufacture. It would also be desirable to provide a grain sweeper with a mechanism for transmitting rotational power from the central power source to the drive structure and drive wheels in an effective and efficient manner to further reduce the cost and complexity of the grain sweeper. It would also be desirable to provide a grain sweeper that allows grain to pass easily into contact with the auger without agitators or other similar devices in front of the auger. It would be desirable for such a grain sweeper to also effectively and efficiently increase the traction provided by the drive structure. It would also be desirable for such a mechanism to include a shroud within which the auger rotates during operation.

BRIEF SUMMARY OF THE INVENTION

The grain sweeper according to the present invention includes an auger which rotates about its axis to direct grain within a grain tank toward a central opening. A drive mechanism is coupled with the auger for pushing the auger on a radius about said central opening such that the auger travels over the entire grain tank floor. An electric motor is positioned proximate the central opening and drives the auger by way of a first belt and pulley system. The drive mechanism includes a front drive wheel which is operatively coupled with the outer end portion of the auger for receiving rotational power therefrom. The drive wheel is coupled with the outer end portion of the auger by way of a second belt and pulley system, a hydraulic pump, lines and motor, a gearbox and chain and sprocket mechanism. Transmitting rotational power directly to the drive wheel by way of the auger reduces the amount of hydraulic line required, reduces the size of the pump and motor, and reduces the size of the hydraulic reservoir. The auger is supported in cantilevered fashion from the front of the drive mechanism. A stack of weights is positioned on the drive mechanism and generally counterbalances the weight transmitted to the drive mechanism from the auger and shroud. This allows the front drive wheel to generally bear all of the weight, whereas the rear wheel serves merely to maintain the drive mechanism in proper position. The increased weight borne by the drive wheel creates greater traction for the drive mechanism, which facilitates operation of the grain sweeper. Supporting the auger in front of the drive mechanism in cantilevered fashion effectively eliminates the need for an agitator and/or a floor engaging support wheel in front of the auger for stabilizing the drive mechanism during operation.

The opening in the auger shroud extends generally the entire length of the auger, and generally does not include structure positioned in front of the auger that would obstruct the free passage of grain into the auger during forward operation of the auger. The need for agitators in front of the auger is thereby eliminated.

The drive mechanism is coupled with the shroud of the auger by way of a coupling mechanism which includes a threaded member and nut. An operator can manipulate the nut on the threaded member for vertically adjusting the position of the auger with respect to the drive mechanism. A slide member fixed with the drive mechanism is received within a channel member fixed with the shroud. The abutment of the slide member against the inner walls of the channel member generally restricts the slide member from shifting laterally with respect to the channel member. The auger and drive mechanism are thereby prevented from shifting laterally with respect to one another. The slide member is slidable vertically within the channel member for allowing the auger to be vertically adjusted as the nut is manipulated on the threaded member. This coupling mechanism is simple in construction, is comprised of few parts, and is relatively easy for an operator to use.

DETAILED DESCRIPTION OF THE INVENTION

Figure 1:
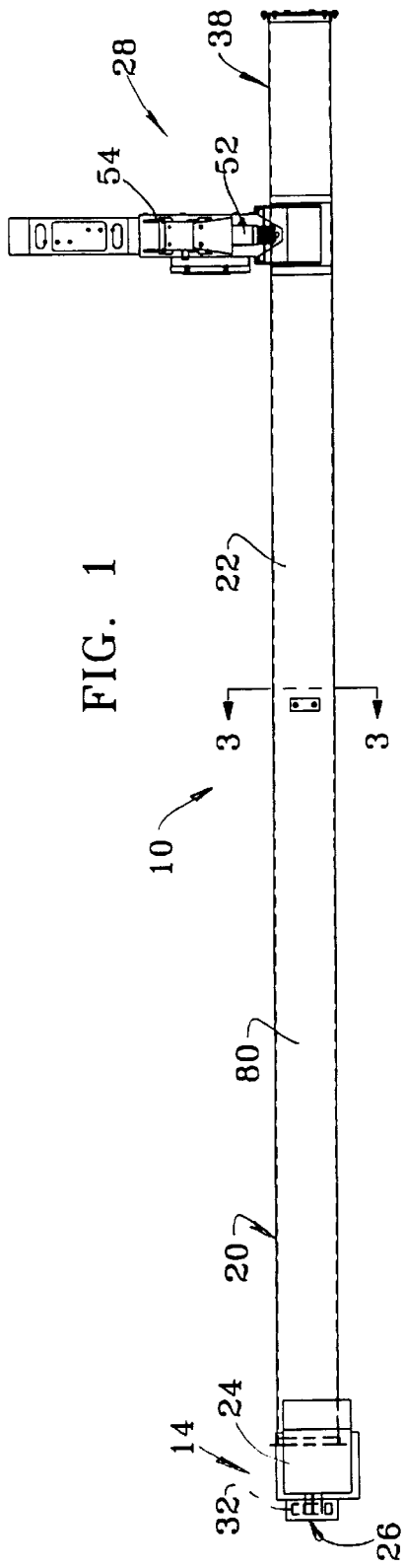
FIG. 1 is a front perspective view of the apparatus of the invention.
Figure 2:
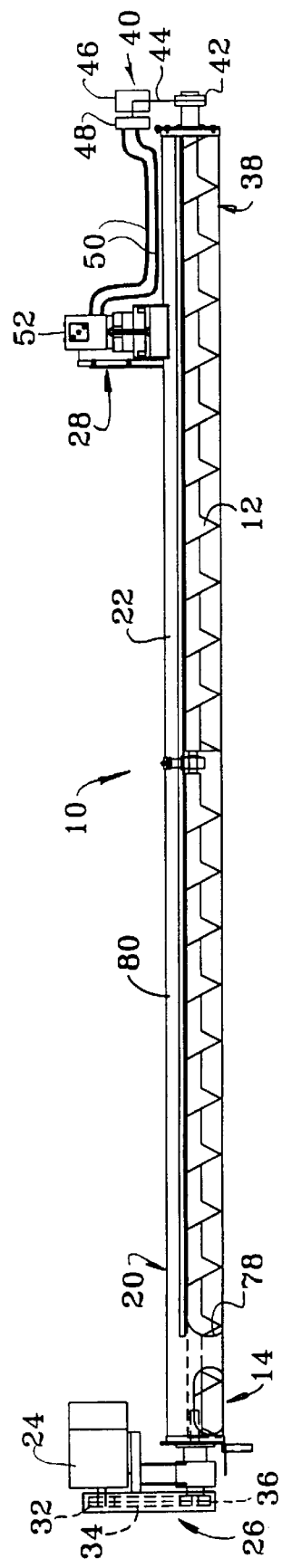
FIG. 2 is a detailed front perspective.
Figure 3:
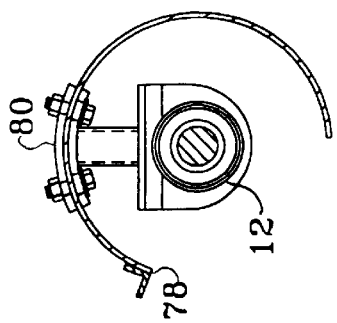
FIG. 3 is a sectional view along line 3—3 of figure one.
Figure 4:
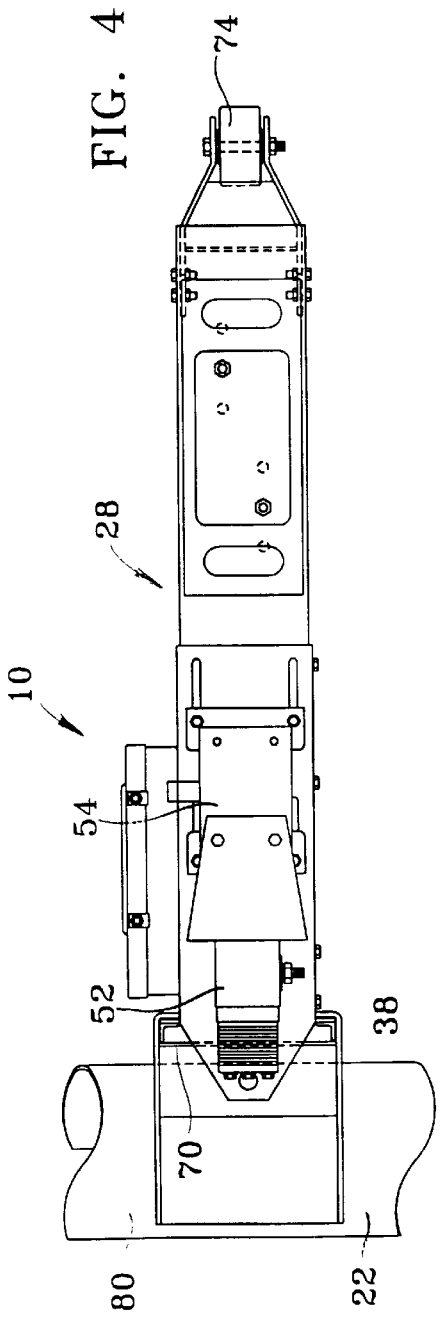
FIG. 4 is a top view of drive mechanism.

Referring now to FIGS. 1–2, there is shown the preferred embodiment of the present invention. A grain sweeper 10 includes an auger 12 which rotates about its axis for directing grain toward a central location or opening 14 formed in the floor 16 of a grain tank 18. The inner end portion 20 of the grain sweeper 10 is swingably coupled to a central structure (not shown) which allows the grain sweeper 10 to swing about the central opening 14. The sweeper 10 includes a shroud or frame 22 within which the auger 12 rotates. A central power source or electric motor 24 is located at the inner end 20 of the sweeper, and supplies rotational power to the auger 12 during operation by way of a first belt and pulley system 26.

A drive mechanism 28 is mounted to the rear of the shroud 22 and includes a drive wheel or traction member 30 which engages the floor 16 of the grain tank 18 for driving the sweeper 10 forwardly about the central opening 14. The drive wheel 30 receives rotational power from the electric motor 24 as follows. The electric motor 24 drives an inner drive pulley 32, inner belt 34 and inner driven pulley 36, which in turn drives the auger 12. The outer end 38 of the auger 12 is operatively coupled with an outer belt and pulley system 40. The outer belt and pulley system 40 includes an outer drive pulley 42 which engages an outer belt 44 for driving an outer driven pulley 46. A hydraulic pump 48 is coupled with the outer driven pulley 46 and receives rotational power therefrom. Hydraulic lines 50 extend between the hydraulic pump 48 and a hydraulic motor 52 mounted to the drive mechanism 28. The hydraulic motor 52 receives rotational power from the hydraulic pump 48 via the hydraulic lines 50, and transmits this rotational power to a gearbox 54 via an output shaft 56. The gearbox 54 then transmits rotational power to the drive wheel 30 via a chain and sprocket mechanism 58.

The drive wheel 30 is therefore operatively coupled with the outer end portion 38 of the auger 12 for receiving rotational power therefrom via the outer belt and pulley system 40, the hydraulic pump 48, motor 52 and lines 50, and the gearbox 54 and chain and sprocket mechanism 58. The auger 12 is one of the components of the grain sweeper 10 according to the present invention that transmits rotational power outwardly from the electric motor 24 to the drive mechanism 28 and drive wheel 30. The auger 12 thereby serves the dual functions of directing grain toward the central opening 14 and of transmitting rotational power outwardly to the drive mechanism 28. By receiving rotational power from the outer end portion 38 of the auger 12, hydraulic lines 50 are not required to extend the entire length of the auger 12 from the electric motor 24 to the drive mechanism 28. Hydraulic lines 50 according to the present invention only extend from the outer end portion 38 of the auger 12 to the drive mechanism 28, which is a relatively short distance. Since the hydraulic lines 50 are relatively short according to the present invention, the hydraulic head losses in the lines 50 are reduced, which allows a relatively small hydraulic pump 48 and motor 52 to be used. Also, since less hydraulic line is used by the grain sweeper 10 according to the present invention, manufacturing costs are reduced. Since the hydraulic lines 50 are shorter, the hydraulic system contains less hydraulic fluid, which allows a relatively small hydraulic reservoir or tank to be used, thereby further reducing the cost of the grain sweeper 10 according to the present invention.

The drive mechanism 28 is coupled with the shroud or frame 22 of the grain sweeper 10 by way of an attaching mechanism 60. The attaching mechanism 60 includes a threaded member 62 fixed with the frame 22. A nut 64 engages the threads 66 of the threaded member 62 and abuts a forwardly extending portion 68 of the drive mechanism 28. An operator can manipulate the nut 64 on the threaded member 62 for adjusting the height at which the auger 12 is held above the floor 16 of the grain tank 18 by the drive mechanism 28. For example, as the operator tightens the nut 64 down on the threaded member 62, the threaded member 62 will shift upwardly within its opening in the drive mechanism 28, and the auger 12 will shift upwardly with respect to the drive mechanism 28 for being supported at a greater height above the floor 16 of the grain tank 18. A slide member 70 is fixed with the drive mechanism 28 and is positioned within a channel member 72 fixed with the shroud 22. The channel member 72 laterally confines the slide member 70 for generally blocking the slide member 70 from shifting side to side. The lateral confinement of the slide member 70 thereby prevents the auger 12 and drive mechanism 28 from shifting laterally with respect to one another. The channel member 72 allows the slide member 70 to shift vertically within the channel member 72 as the nut 64 is adjusted on the threaded member 62. The channel and slide members 72 and 70 therefore allow the vertical position of the auger 12 to be adjusted by manipulation of the nut 64 on the threaded member 62. This attaching mechanism 60 is comprised of relatively few parts, which tends to lower the manufacturing costs of the grain sweeper 10. The attaching mechanism 60 is simple in construction and is relatively easy for an operator to adjust.

Figure 5:
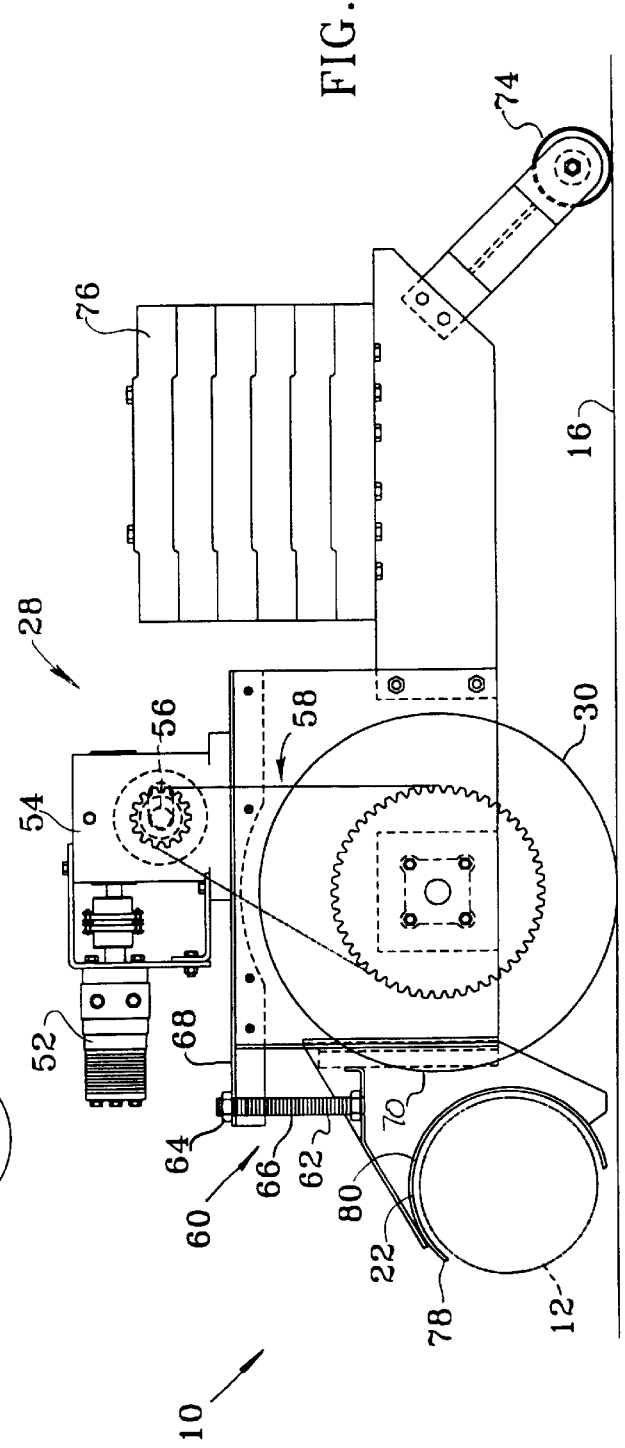
FIG. 5 is a sectional view of drive mechanism.

Referring now to FIG. 5, there is shown a side view of the auger 12, frame 22 and drive mechanism 28. The auger 12 is positioned forwardly of the drive mechanism's drive wheel 30. A rear floor engaging wheel 74 is also provided. The drive mechanism 28 includes a plurality of weights 76 positioned to the rear of the drive wheel 30 as will be described in detail. The drive mechanism 28 is generally balanced such that the drive wheel 30 bears a large proportion of weight and the rear wheel 74 bears a relatively small proportion of weight. Practically all of the weight borne by the drive wheel 30 and rear wheel 74 is transmitted to the floor 16 via the drive wheel 30. The hydraulic motor 52, gearbox 54 and sprocket and chain mechanism 58 are positioned generally directly above the drive wheel 30 such that their weight is generally borne by the drive wheel 30. The auger 12 and frame 22 are positioned forwardly of the drive wheel 30, and therefore any of their weight that is transmitted to the drive mechanism 28 tends to be borne by the drive wheel 30. The weight stack 76 is positioned to the rear of the drive wheel 30, and is generally equal to the amount of weight transmitted to the drive mechanism 28 from the auger 12 and frame 22. The weights 76 therefore generally prevent the drive mechanism 28 from tipping forwardly under the weight of the auger 12 and frame 22. But since the weights 76 are sized to approximate the weight added to the drive mechanism 28 by the auger 12 and frame 22, the weights 76 tend not to transmit their weight to the rear wheel 74. Rather, the weight of the weight stack 76 tends to be transmitted to the drive wheel 30. By balancing this distribution of weight almost entirely onto the drive wheel 30, the drive wheel 30 will engage the floor 16 of the grain tank 18 with greater traction, and will thereby drive the grain sweeper 10 forwardly with the greater effectiveness. The rear wheel 74 is provided for preventing the drive mechanism 28 from tilting rearwardly during operation. The rear wheel 74 thereby serves to maintain the drive mechanism 28 and auger 12 in proper position and alignment during operation, but is not designed to bear much of the weight of the drive mechanism 28.

The weight stack 76 is large enough to counterbalance the weight of the auger 12 and frame 22 imparted to the drive mechanism 28. Since the drive mechanism 28 and auger 12 are supported by the drive wheel 30 and rear wheel 74 in stable fashion, the present invention eliminates the requirement for a floor engaging wheel or agitator in front of the auger 12 that are provided by prior art grain sweepers for supporting and stabilizing the auger. Due to the weight distribution according to the present invention, the auger 12 can be suspended from the front of the drive mechanism 28 in cantilevered fashion without requiring any additional wheel in front of the auger 12. Since there is no structure in front of the auger 12 according to the present invention, the grain will uniformly be received by the auger 12 and will not be blocked or otherwise obstructed from being engaged by the auger 12. The flow of grain into the auger 12 and toward the central opening is thereby enhanced.

The grain sweeper 10 according to the present invention includes a shroud or frame 22 which provides an opening 78 in front of the auger 12. The opening 78 extends generally the entire length of the auger 12. The shroud 22 generally does not include material that extends downwardly in front of the auger 12 that would obstruct the passage of grain into engagement with the auger 12. Engagement of grain by the auger 12 is thereby enhanced such that the need for an agitator or other mechanism in front of the auger 12 is generally eliminated. The shroud 22 does include a top portion 80 that generally covers the auger 12 when viewed from above. This top portion 80 helps block objects or a person's feet and hands from coming in contact with the auger 12 from above.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A sweeper mechanism adapted for directing grain in a circular grain tank to a central location adjacent a center of said tank, said sweeper mechanism comprising:
   a) an auger extending outwardly from said central location, said auger being adapted for rotation for directing grain within said grain tank toward said central location, said auger also being adapted to swing on a radius about said central location;
   b) a frame which supports said auger;
   c) a traction member coupled with the frame radially outwardly from the central opening, said traction member being adapted to engage the floor of the grain tank for driving the frame and auger about said central location;
   d) a power source operatively coupled with the auger for transmitting rotational power to the auger; and
   e) said traction member is operatively coupled with the auger for receiving rotational power from the auger;
   f) a hydraulic pump operatively driven by an end portion of the auger opposite the central location, said hydraulic pump being operatively coupled with a hydraulic motor for driving said hydraulic motor, said hydraulic motor operatively coupled with the traction member for driving said traction member.

2. The invention of claim 1, and further comprising a belt and pulley system coupled with the end portion of the auger opposite the central location for transmitting rotational power from the auger to the hydraulic pump.

3. A sweep mechanism adapted for directing grain in a circular grain tank to a central location adjacent a center of said tank, said sweeper mechanism comprising:
   a) an auger extending outwardly from said central location, said auger being adapted for rotation for directing grain within said grain tank toward said center, said auger also being adapted to swing on a radius about said central location;
   b) a frame which supports said auger;
   c) a traction member coupled with the frame radially outwardly from the central location, said traction member being adapted to engage the floor of the grain tank for driving the frame and auger about said central location;
   d) a power source operatively coupled with the auger proximate the central location for transmitting rotational power to the auger;
   e) said traction member is operatively coupled with an end portion of the auger opposite the central location for receiving rotational power from the auger; and
   f) a hydraulic pump drivingly coupled with the end portion of the auger opposite the central location, said hydraulic pump being operatively coupled with a hydraulic motor which drives the traction member.

4. The invention of claim 3, and further comprising a belt and pulley system coupled with the end portion of the auger opposite the central location for transmitting rotational power from the auger to the hydraulic pump.

5. The invention of claim 4, wherein said traction member is a wheel.

6. A grain sweeper, comprising:
   a) an auger rotatable for directing grain toward a central location within a grain tank, said auger being supported by a frame;
   b) a drive mechanism coupled with said frame for driving said frame and auger about said central location, said drive mechanism further comprises;
      1) first and second floor engaging wheels, at least one of said wheels connected to the drive mechanism the first wheel being positioned forward of the second wheel with respect to forward movement of the sweeper during operation; and
   c) said auger is positioned forward of the first wheel and supported entirely by the first and second wheels, and the auger is the fowardmost portion of the grain sweep.

7. The invention of claim 6, wherein said first wheel is driven for propelling the grain sweeper about the central location.

8. The invention of claim 7, wherein the weight of the drive mechanism to the rear of the first wheel is approximately equal to the weight of the drive mechanism in front of the first wheel and the weight of the auger and frame supported by the drive mechanism, is such that the weight borne by the first and second wheels is generally entirely borne by the first wheel.

9. The invention of claim 8, wherein the drive mechanism includes weights positioned to the rear of the first wheel and which counterbalance the weight of the auger and frame borne by the first wheel of the drive mechanism.

10. The invention of claim 8, and further comprising a hydraulic motor and gears which operatively drive said first wheel, said hydraulic motor and gears being positioned generally directly above said first wheel.

11. The invention of claim 9, and further comprising a hydraulic motor and gears which operatively drive said first wheel, said hydraulic motor and gears being positioned generally directly above said first wheel.

12. The invention of claim 11, wherein said auger is the forwardmost portion of the grain sweep.

13. A coupling mechanism for coupling a drive mechanism with a grain sweeper, said grain sweeper comprising a frame structure which supports an auger which is rotatable for directing grain in a circular grain tank to a central location adjacent a center of said tank, said auger being driven by a drive mechanism to swing on a radius about said center, said drive mechanism being coupled with said frame by way of the coupling mechanism, said coupling mechanism comprising:
   a) a threaded member extending between said drive mechanism and said frame in a vertical dimension and being adjustable for adjusting the vertical position at which the frame and auger are supported by the drive mechanism; and
   b) mating slide and channel members fixed with respect to the frame and drive mechanism, said slide member being in shiftable abutment with the channel member for shifting with respect to the channel member in the vertical dimension as the threaded member is adjusted, and the slide member is generally confined within said channel member for blocking said slide member, frame and auger from shifting laterally with respect to the channel member and drive mechanism during operation.

14. The invention of claim 13, wherein said slide member is fixed with respect to the drive mechanism, and the channel member is fixed with respect to the frame.

15. The invention of claim 13, and further comprising a nut member which engages the threaded member and is adjustable on the threaded member for altering the position of the frame with respect to the drive mechanism.

16. The invention of claim 13, wherein said threaded member, slide member and channel member are the sole means for coupling the drive mechanism with the frame.

17. The invention of claim 14, and further comprising a nut member which engages the threaded member and is adjustable on the threaded member for altering the position of the frame with respect to the drive mechanism.

* * * * *